United States Patent [19]

Bangle

[11] 4,061,351
[45] Dec. 6, 1977

[54] REMOVABLE SKATEBOARD HANDLE POST

[76] Inventor: Roger L. Bangle, 26264 Orchid Drive, Highland, Calif. 92346

[21] Appl. No.: 735,390

[22] Filed: Oct. 26, 1976

[51] Int. Cl.² .............................................. B62M 1/00
[52] U.S. Cl. .............................. 280/87.04 A; 16/114 R; 403/234
[58] Field of Search .............. 16/114 R; 280/87.04 R, 280/87.04 A, 47.37 R; 403/234, 233, 237, 235, 236

[56] References Cited

U.S. PATENT DOCUMENTS

| 1,135,615 | 4/1915 | Rathmann | 403/233 X |
| 1,445,219 | 2/1923 | Larson | 280/87.04 A |
| 1,798,572 | 3/1931 | Welton | 403/236 X |
| 2,522,702 | 9/1950 | Charley | 403/234 X |
| 2,582,143 | 1/1952 | Maas | 280/87.04 A |
| 2,589,075 | 3/1952 | Gravis | 403/233 X |

FOREIGN PATENT DOCUMENTS 653,347  11/1928  France ................................... 403/233

*Primary Examiner*—Andrew V. Kundrat
*Attorney, Agent, or Firm*—John H. Crowe

[57] ABSTRACT

A handle post for attachment to a skateboard, the post having a socket in the lower end thereof, an anchor piece in the socket and a tension bar extending between the anchor piece and the top of the post. Stirrups having portions engageable with the underside of the skateboard are adjustably attached along opposite sides of the handle post, to the anchor piece to accomodate skateboards of different thicknesses and widths.

7 Claims, 6 Drawing Figures

U.S. Patent  Dec. 6, 1977  4,061,351
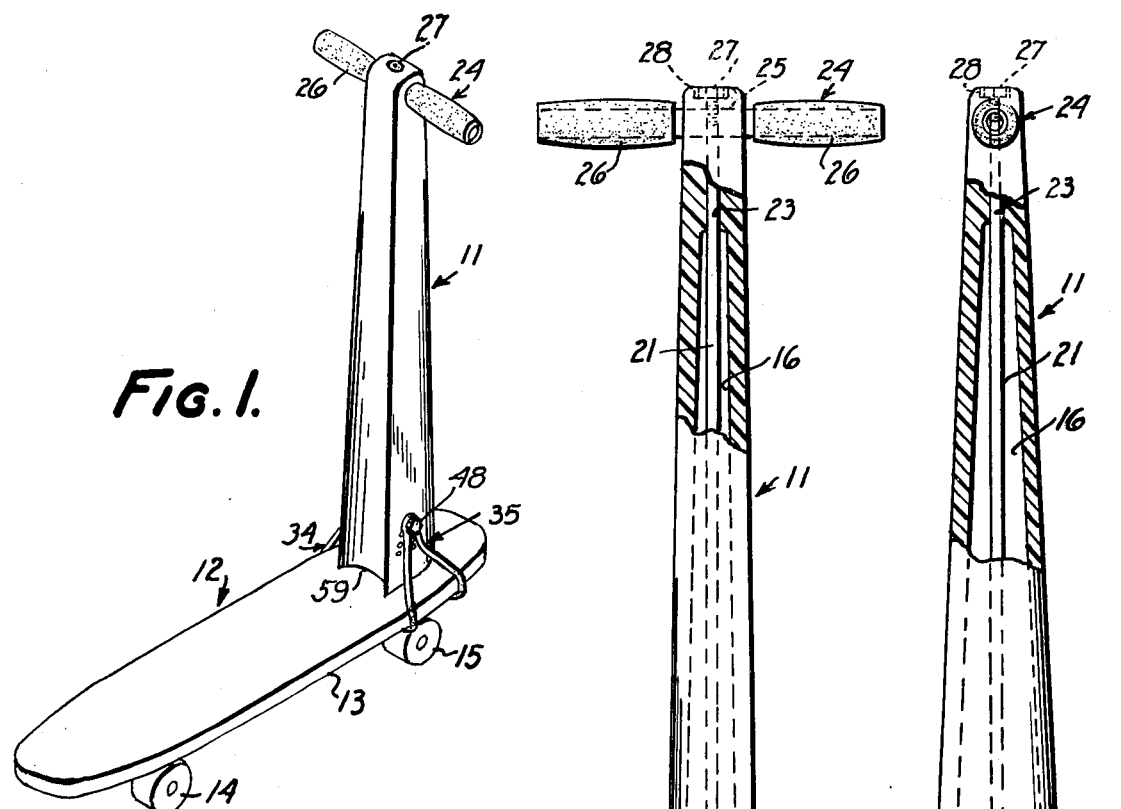
Fig. 1.
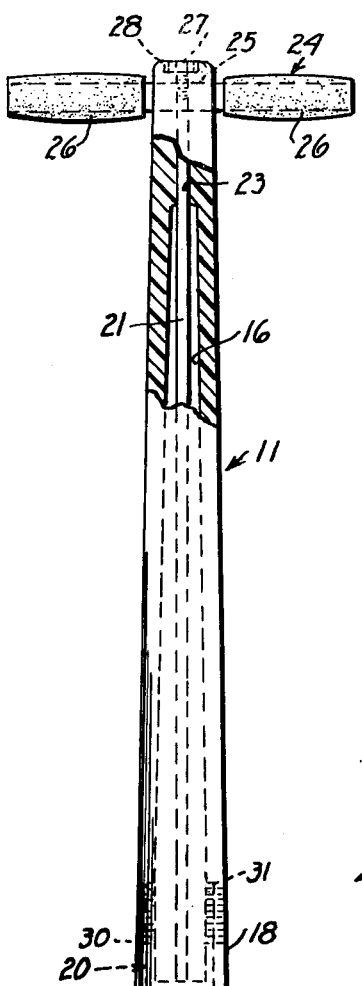
Fig. 2.
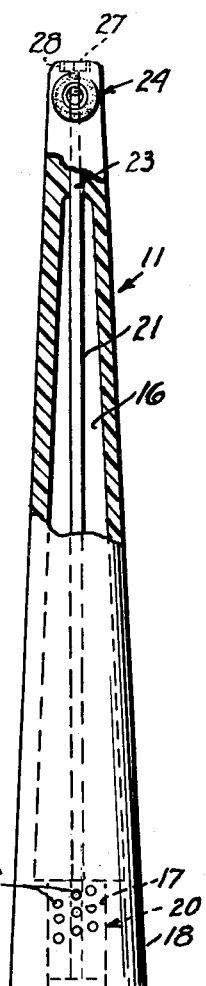
Fig. 3.
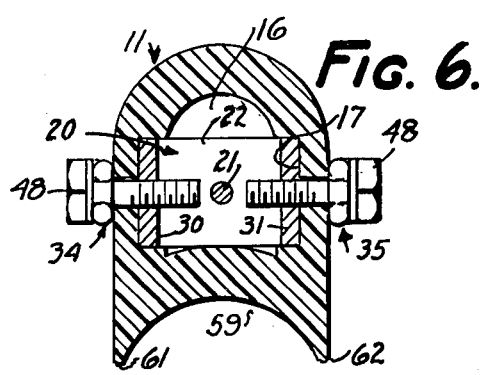
Fig. 6.
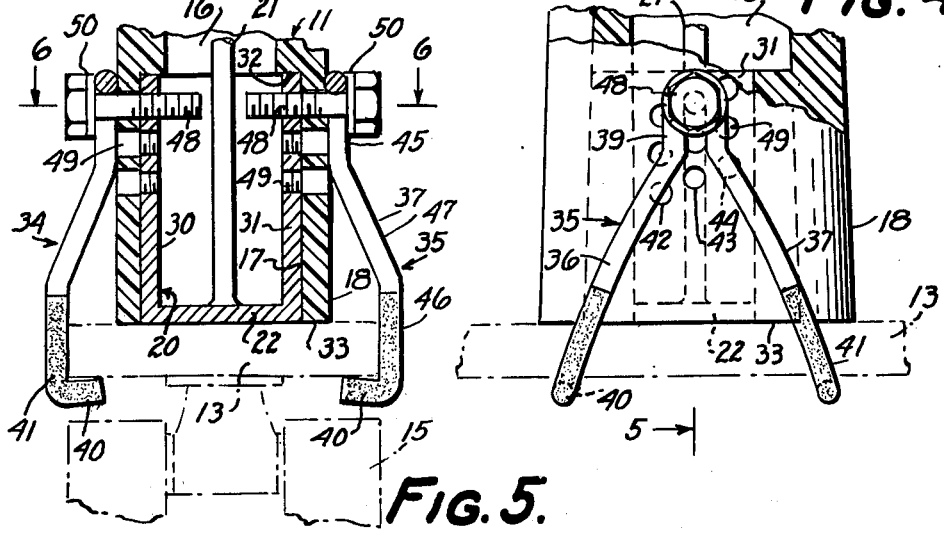
Fig. 4.
Fig. 5.

REMOVABLE SKATEBOARD HANDLE POST

BACKGROUND OF THE INVENTION

1. Field of the Invention

This invention relates to skateboards and has particular reference to a removable handle post for converting a skateboard into a scooter or the like.

2. Description of the Prior Art

Skateboards, which have been in general use for a number of years, generally comprise an elongate board or platform having sets of small wheels supporting the opposite ends of the platform. A skilled rider, by properly balancing and shifting his weight on the platform can propel and guide the skateboard in different directions and also perform a multitude of maneuvers. Skateboard riding, however, requires a considerable amount of skill and, particularly under certain conditions, can be hazardous to the novice and underaged children.

Scooters, on the other hand, are somewhat similar to skateboards but have handle posts rigidly secured to the board to enable the rider to more easily maintain his balance and maintain control of the device. Thus, a scooter is more suitable for beginners or relatively small children.

SUMMARY OF THE INVENTION

A principal object of the present invention is to provide a readily attachable handle post for a skateboard to transform the latter into a scooter or the like and, thus extend the usefulness of the same to encompass children of a wider range of ages and proficiencies.

Another object is to provide a light-weight handle post which may be rigidly attached to a skateboard.

Another object is to provide a handle post which may be readily attached to skateboards of different widths and thicknesses.

Another object is to provide a handle post which may be rigidly attached to a skateboard without requiring protruding stays or braces of such configuration that they might otherwise interfere with the rider.

A further object is to provide a handle post which may be removably attached to a skateboard of conventional design without modifying or marring the skateboard.

According to the present invention, a hollow handle post of wood, plastic or other light-weight material is provided having a socket at the lower end thereof to receive an anchor piece. The latter is held in the socket by a tension bar which extends through the post and is secured under tension to the upper end thereof. Stirrups engage the under side of the skateboard and are adjustably attached to the anchor piece so that the handle post may be readily attached to skateboards of different thicknesses and widths without requiring attachment holes to be drilled in the skateboard or otherwise marring the skateboard.

BRIEF DESCRIPTION OF THE DRAWING

The manner in which the above and other objects of the invention are accomplished will be readily understood on reference to the following specification when read in conjunction with the accompanying drawing, wherein:

FIG. 1 is a perspective view illustrating a skateboard and a handle post attached thereto which embodies a preferred form of the present invention.

FIG. 2 is a rear elevation view, partly in section, of the handle post.

FIG. 3 is a side elevation view, partly in section, of the handle post.

FIG. 4 is an enlarged fragmentary side view, partly in section, of the lower or base portion of the handle post.

FIG. 5 is a section view taken along the line 5—5 of FIG. 4.

FIG. 6 is a section plan view taken substantially along line 6—6 of FIG. 5.

DESCRIPTION OF THE PREFERRED EMBODIMENT

Referring to the drawing, the handle post of the present invention is generally indicated at 11 and is shown in FIG. 1 as attached to a skateboard 12 of conventional design. The latter comprises an elongate platform 13 which is rounded at opposite ends and is supported by sets 14 and 15 of small wheels located adjacent opposite ends of the platform 13.

The handle post 11 is preferably formed of wood, plastic or other light-weight material. In order to further lighten the post 11, it is preferably hollowed out as indicated at 16 and is formed with a socket 17 at its lower base portion 18 in which is snugly fitted a U-shaped anchor piece 20, preferably of metal. A tension bar 21 is welded or otherwise integrally secured to the center of the cross member 22 of the anchor piece 20 and extends upwardly through the handle post and through a hole 23 formed in the upper end thereof.

A handle 24 of tubular material is fitted in a cross hole 25 formed in the upper end of the handle post, and is locked in place by the bar 21 which passes through the mid portion of such handle. Hand grips 26 of rubber or the like are preferably fastened to the opposite ends of the handle 24.

The upper end of the tension bar 21 is screw threaded to receive a nut 27 fitted within a counter bore 28 formed in the upper end of the handle post. By tightening the nut 27, the bar 21 may be placed under tension to hold the sides 30 and 31 of the anchor piece 20 against the upper edges 32 of the socket 17, thereby placing the handle post in compression, resulting in a substantially rigid yet light-weight handle post.

It will be noted that the bottom surface of the cross member 22 of the anchor piece lies flush with the bottom edge 33 of the anchor post to form a solid base for the post for engagement with the upper surface of the skateboard platform 13.

For the purpose of attaching the handle post 11 to skateboard of different thicknesses and widths, two stirrups 34 and 35 are provided which are of similar construction. Each stirrup comprises a stiff metal rod bent to form an inverted U-shaped section 39 and downwardly diverging legs 36 and 37 which terminate in inwardly extending gripping portions 40 for engagement with the underside of the skateboard platform 13. The lower portions of both legs of the stirrups 34 and 35, including the gripping portions 40, are preferably coated with a relatively soft plastic or rubber coating, as indicated at 41, to prevent marring or otherwise disfiguring the surface of the skateboard platform 13. Such coating may be applied by dipping or spraying the stirrups with a suitable conventional rubbery solution which sets after application.

As seen particularly in FIGS. 4 and 5, three sets 42, 43 and 44 of vertically aligned holes 49 are formed co-extensively through opposite sides of the handle post 11 and adjacent sides 30 and 31 of the anchor piece 20, the holes in the anchor piece being screw threaded. It will be noted that the various holes 49 are staggered vertically relatively to each other so that each hole is located slightly above another.

As will be seen in FIG. 5, each leg, i.e., 37, of each stirrup is bent to form two parallel sections 45 and 46 connected by an inclined section 47. Also, the gripping section 40 is bent to incline upward slightly relative to the horizontal. A relatively long bolt 48 having a washer 50 fitted against the head thereof is inserted through the U-shaped portion 39 of each stirrup and, depending on the thickness of the skateboard 13 is fitted in an appropriate one of the holes 49. Upon tightening the bolts 48, the latter draw the respective stirrups inwardly to lock the handle post in place as a rigid and integral part of the assembly.

As will be seen in FIGS. 1 and 6, the lower portion of the handle post 11 is formed concave at 59 when viewed in plan, resulting in two spaced points of engagement 61 and 62 which are spaced sufficiently from the tension bar 21 to provide adequate footing for the handle post. Also, the concave shape of the handle post enables the rider to locate the grip of one of his feet thereagainst and thus center that foot on the platform by feel.

Alternatively, if desired, the stirrups 34 and 35 may be shortened in height and turn-buckles of conventional design, not shown, may be connected between the stirrups and their respective bolts 48 to enable additional adjustment for accomodating skateboards of different thicknesses and widths.

It will be obvious to those skilled in the art that many variations may be made in the exact construction shown without departing from the spirit of this invention.

I claim:

1. A handle post for attachment to a skateboard or the like comprising
   a post having a base portion,
   said post having a socket in said base portion,
   an anchor piece in said socket, and
   a tension bar extending through said post,
   said bar being tensioned between said anchor piece and the top of said post, and
   means for removably attaching said anchor piece to said skateboard,
   said post having an opening therein adjacent the top, and a handle extending in said opening, and
   said tension bar extending through said handle whereby to lock said handle in said opening.

2. A handle post for attachment to a skateboard or the like comprising
   a post having a base portion,
   said post having a socket in said base portion,
   an anchor piece in said socket, and
   a tension bar extending through said post,
   said bar being tensioned between said anchor piece and the top of said post,
   means for removably attaching said anchor piece to said skateboard, comprising stirrups on opposite sides of said post for engagement with the underside of said skateboard, and
   attaching devices for respective ones of said stirrups, said attaching devices being extendable through openings in said side of said post and removably attachable to said anchor piece.

3. A handle post as defined in claim 2 wherein said attaching devices comprise screw threaded bolts,
   said bolts being removably threadable in holes in said anchor piece.

4. A handle post as defined in claim 3 wherein said holes are spaced different distances from the bottom of said base portion whereby said post may be attached to skateboards of different sizes.

5. A handle post as defined in claim 2 wherein said stirrups comprise downwardly diverging legs,
   said legs having offset portions to engage the underside of said skateboard.

6. A handle post for attachment to a skateboard or the like comprising
   a post having a base portion,
   said post having a socket in said base portion,
   an anchor piece in said socket, and
   a tension bar extending through said post,
   said bar being tensioned between said anchor piece and the top of said post, and
   means for removably attaching said anchor piece to said skateboard,
   the rear side of said post being concave whereby to form two points of engagement with said skateboard spaced from each other and from said tension bar.

7. A handle post for attachment to a skateboard or the like comprising
   a post having a base portion,
   said post having a socket in said base portion,
   an anchor piece in said socket, and
   a tension bar extending through said post,
   said bar being tensioned between said anchor piece and the top of said post, and
   means for removably attaching said anchor piece to said skateboard,
   said socket opening into the bottom of said post and the bottom surface of said anchor piece extending flush with said bottom, said anchor piece being U-shaped,
   the sides of said anchor piece fitting along the sides of said socket,
   the attaching means comprising stirrups on opposite sides of said post for engagement with the underside of said skateboard, and
   bolts passing through said stirrups,
   said bolts passing through respective openings in said post and being threadedly secured in adjacent openings in the anchor piece sides.

* * * * *